United States Patent [19]

Van Sorge

[11] 3,923,738

[45] Dec. 2, 1975

[54] PROCESS FOR THE FORMATION OF POLYPHENYLENE ETHERS OF CONTROLLED PARTICLE SIZE

[75] Inventor: Bernardus J. Van Sorge, Ravena, N.Y.

[73] Assignee: General Electric Company, Waterford, N.Y.

[22] Filed: July 23, 1974

[21] Appl. No.: 490,940

[52] U.S. Cl. ............................................ 260/47 ET
[51] Int. Cl.² ......................................... C08G 65/46
[58] Field of Search ................................. 260/47 ET

[56] References Cited
UNITED STATES PATENTS
3,789,054   1/1974   Izawa et al. ........................... 260/51

Primary Examiner—Howard Schain
Attorney, Agent, or Firm—William F. Mufatti, Esq.; Granville M. Pine, Esq.; Edward A. Hedman, Esq.

[57] ABSTRACT

Polyphenylene ether resins with narrow particle size distribution, higher bulk density, and of substantially lower content of dusty, fine particles are obtained by precipitation from their solution in an organic aromatic solvent with a non-solvent medium which is capable of forming a two-phase system with the aromatic solvent. In especially preferred embodiments, the polyphenylene ethers assume spheroidal shape during precipitation. The improved form of polyphenylene ethers facilitates bagging, transfer and compounding, and improves the appearance and physical properties of articles molded therefrom.

20 Claims, 2 Drawing Figures

PROCESS FOR THE FORMATION OF POLYPHENYLENE ETHERS OF CONTROLLED PARTICLE SIZE

This invention relates to an improvement in a process to recover polymers from solutions. More particularly, it relates to an improved method to provide polyphenylene ethers predominantly in the form of spherical particles with a narrow size distribution and a very low content of dusty fine particles.

BACKGROUND OF THE INVENTION

The polyphenylene ethers and processes for their preparation are known in the art and described in numerous publications including Hay, U.S. Pat. Nos. 3,306,874 and 3,306,875, owned by the assignee of this application, and incorporated herein by reference.

The polyphenylene ether resins are useful as thermoplastic molding compounds, either alone, or in compositions with other resins, e.g., polystyrene resins.

By way of illustration, the most useful polyphenylene ethers will be those of the formula:

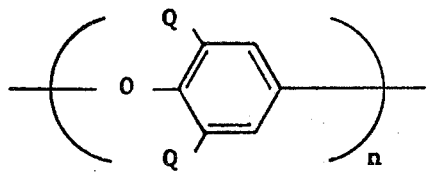

wherein the ether oxygen atom of one unit is connected to the benzene nucleus of the next adjoining unit, $n$ is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals and halohydrocarbonoxy radicals having at least two carbon atoms between the halogen atoms and the phenyl nucleus. The most valuable polyphenylene ethers are those wherein the Q's are each alkyl groups of from 1 to 6 carbon atoms, and particularly wherein the Q's are each methyl groups.

According to the Hay patents, the polyphenylene ether resins are prepared by oxidative coupling of the correspondingly-substituted phenol in the presence of oxygen and a complexed copperamine catalyst. The reaction is preferably carried out in a diluent for both the phenolic compound and the complexed copper salt catalyst and, although the solvent can be selected to provide that the polyphenylene ether precipitates as soon as the desired molecular weight is reached, it is more conventional to use a solvent in which the polymer is soluble and to recover the high molecular weight product by mixing the reaction mixture with enough non-solvent for the polymer (also known as "anti-solvent") to precipitate the high molecular weight polyphenylene ether.

By way of illustration, if the reaction is carried out in pyridine, quinoline, N-methyl morpholine, α-picoline, etc., as solvents, pouring the reaction mixture into non-solvents such as a mixture of water and methanol, or ethanol, isopropanol, acetone, etc., precipitates the product. If the reaction is carried out in an aromatic solvent, such as o-dichlorobenzene, benzene, toluene, the isomeric xylenes, etc., subsequent mixing of the reaction mixture with a (lower)alkyl ($C_1$-$C_6$) alcohol as non-solvent precipitates the product.

In all of these prior art procedures, the solvent and the non-solvent form miscible, one-phase systems.

The use of aromatic solvent media is preferred for commercial embodiments and the generally preferred non-solvents are (lower)alkyl alcohols or (lower)alkyl ketones.

However, in general, the use of aromatic solvents and (lower)alkyl alcohols or ketones as non-solvents leads to a form of precipitated polyphenylne ether which has an undefined powdery shape and an undesirably high content of dusty fine particles, e.g., those of less than 200 mesh, U.S. Standard Sieve size. These fine particles cause dust losses in bagging the product and in transferring the product through various conveyor systems. Moreover, these fine particles are believed to be responsible for the need to run compounding extruders at an uneconomically low rate. Too many fine particles also appear to adversely effect the surface appearance as well as the ultimate elongatiion of compositions made by blending such polyphenylene ethers with other resins.

It has now been discovered that if the non-solvent is changed in composition so as to become capable of forming a two-phase system with the solvent, and if the polyphenylene ether is precipitated from such a two-phase system, there is a very favorable suppression of fine particle formation. Moreover, over the ranges of compositions to be specified hereinafter, there can be provided precipitated polyphenylene ethers in the form of little spheres. A further, unexpected advantage is that the particle size distribution of the polyphenylene ether is extremely narrow.

The process is advantageously carried out either in batch equipment or, most conveniently, in the continuous processes employed commercially.

Figure 1:
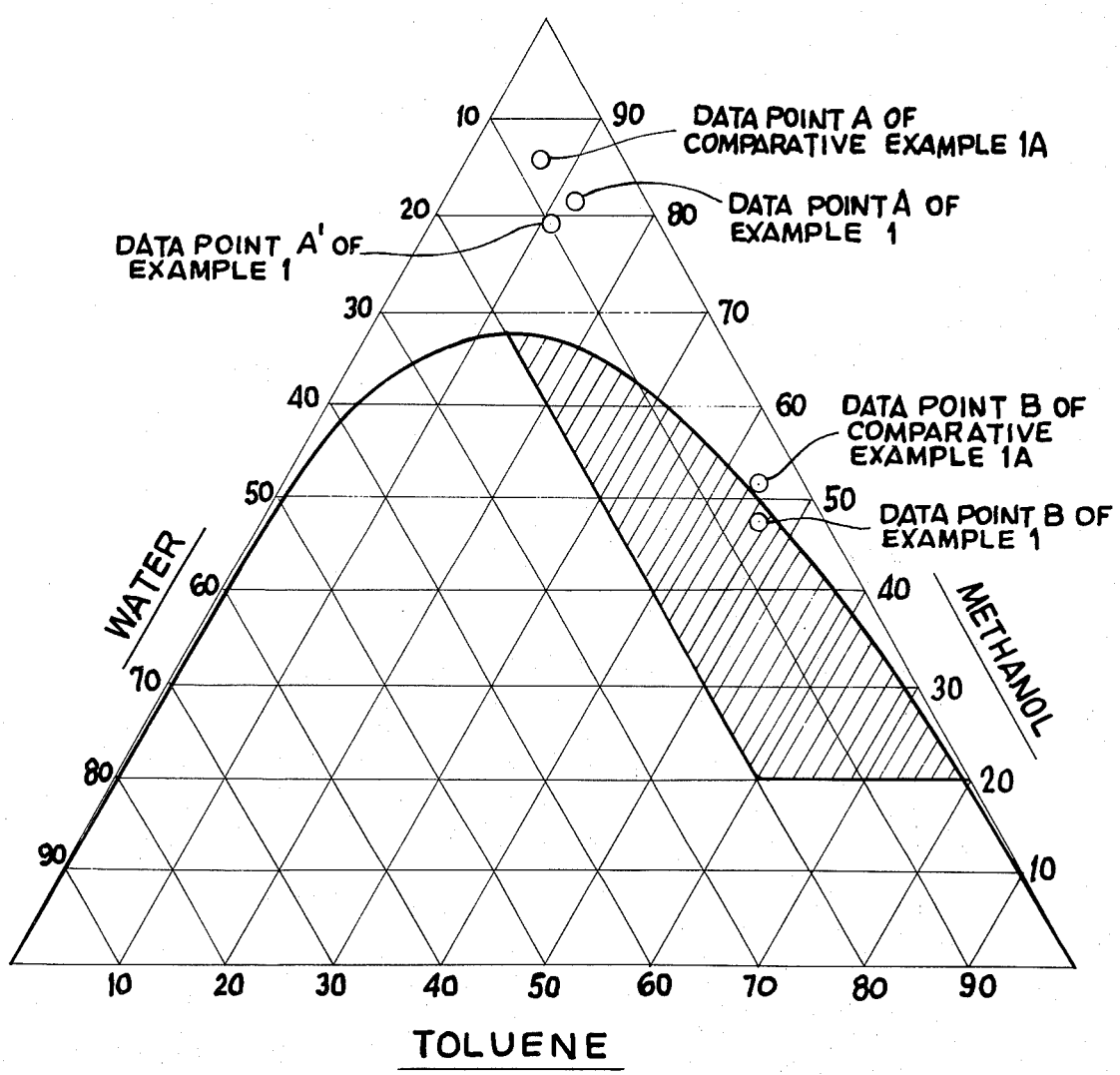
In FIG. 1 is shown a ternary composition diagram for the system toluene-methanol-water, with the binodal curve, representing the dividing line between the one-phase region (above the binodal curve) and the two-phase region (below the binodal curve) at 25°C. The data points represent compositions of the non-solvent and the overall composition of mixtures of non-solvent and solvent from which the PPO is precipitated, used according to this invention (Example 1) with a typical process of the prior art (Comparative Example 1A). These will be explained in detail hereinafter.

DESCRIPTION OF THE INVENTION.

According to the present invention, in a process for recovering a polyphenylene ether from a solution thereof in an aromatic solvent by mixing the solution with a non-solvent for the polyphenylene ether in an amount sufficient to precipitate the polyphenylene ether, there is provided an improvement which comprises using as the non-solvent, a medium which is also capable of forming a two-phase system with the aromatic solvent.

The polyphenylene ethers can be those illustrated above. The organic solvent can be any of those used conventionally for polyphenylene ethers, including benzene, toluene, the xylenes, ethyltoluene, chlorobenzene, dichlorobenzene, nitrobenzene, bromobenzene, and the like, although benzene, toluene and the xylenes are preferred, especially toluene. The non-solvent consists of a mixture that, added in the proper amount, forms a two-phase system with the solvent and can comprise a mixture of water and a (lower)alkyl ($C_1$-$C_6$) alcohol, such as methanol, ethanol, isopropanol, n-butanol, or a (lower)alkyl ($C_1$-$C_6$) ketone, such as acetone, methyl ethyl ketone, di-n-propyl ketone, or mixture of such alcohols or ketones with water. Those skilled in the art will be able to select as a precipitating medium a mixture of alcohol and/or ketones and water such that the precipitation occurs in the desired two-phase system. Preferably, the non-solvent will comprise a mixture of a (lower)alcohol, preferably methanol, ethanol or isopropanol or a (lower)ketone, such as acetone, and enough water to provide the two-phase system. In most preferred systems, the solvent will comprise toluene and the non-solvent will comprise methanol, containing from 5 to 20, preferably from 5 to 15 and especially preferably from about 7 to 12% by weight of water (based on the total weight).

In preferred embodiments, one phase of the two-phase system will consist substantially of a (lower)alkyl alcohol and water, or a (lower)alkyl ketone and water, with a relatively small amount of the aromatic solvent, and the second phase will consist substantially of the aromatic solvent and the polyphenylene ether, and will include only a very small amount of water and a relatively small amount of the (lower)alkyl alcohol.

In especially preferred embodiments, one phase of the two-phase system will consist substantially of from 25 to 70% of methanol and of from 2 to 20% of water and of from 15 to 70% of toluene and the second phase will comprise from about 50 to 85% of toluene and of from about 10 to 50% of methanol and of from about 0.5 to 10% of water.

In other preferred embodiments the weight ratio of (lower)alkyl alcohol or (lower)alkyl ketone to water in the non-solvent will be 1:5 to 1:20 of water to alcohol or ketone, preferably methanol; and in these systems, toluene is the especially preferred aromatic solvent component.

The process is carried out conventionally. The polyphenylene ether can be present in the organic solvent as a product stream from a reactor and it can include catalyst residues, stabilizers and other conventionally present substances, such as acetic acid or other reaction terminators, in minor amounts. Alternatively, a polyphenylene ether resin previously isolated can be re-dissolved in the aromatic solvent and then re-precipitated in the two-phase system of this invention. The non-solvent can be added to the solution of polyphenylene ether or vice-versa. Enough non-solvent is used to arrive at the desired overall composition of the two-phase system and to substantially completely precipitate the polyphenylene ether. It is preferred to mix and precipitate with efficient agitation. The precipitated product is recovered in any conventional way, e.g., by centrifugation, filtration, decantation and the like, and after freeing from the remaining amounts of solvent-non-solvent, the improved product provided by this invention can be bagged and stored, or transported and mixed, or molded, all in accordance with conventional procedures.

DESCRIPTION OF THE PREFERRED EMBODIMENTS.

The following examples illustrate the process of this invention. A comparative trial is also included to demonstrate the advantages provided by the present process. The examples are illustrative and not limitative.

EXAMPLE 1

Figure 2:
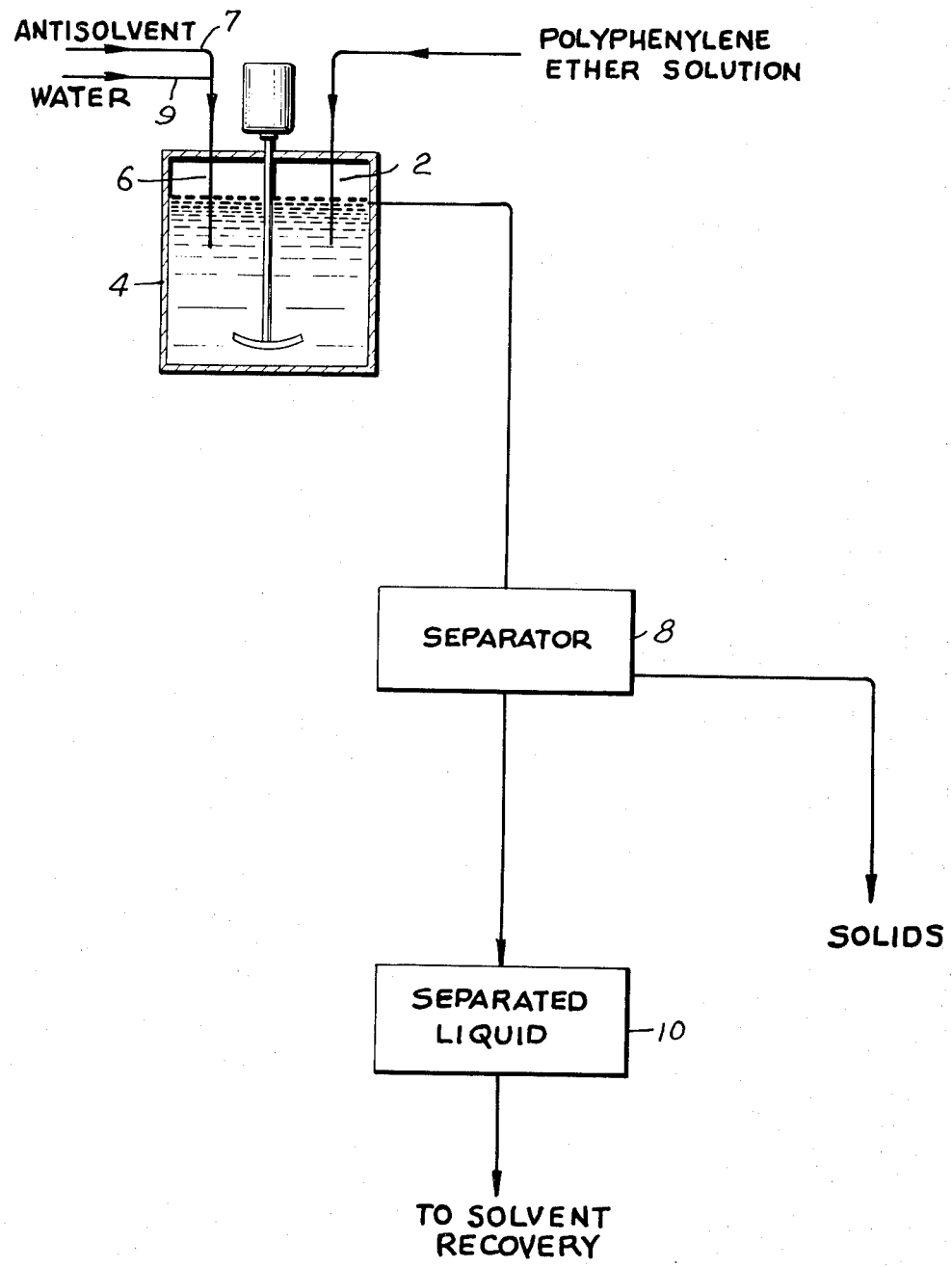
FIG. 2 illustrates in semi-schematic form a processing system in which the present process can conveniently be carried out.

An apparatus illustrated semi-schematically in FIG. 2 is employed. The solution of polyphenylene ether in aromatic solvent is introduced through dip pipe 2 into agitated precipitation vessel 4, into which non-solvent is also introduced through dip pipe 6. In the embodiment shown, alcohol or ketone can be introduced through conduit 7, and water through conduit 9. The precipitated polyphenylene ether suspension overflows to separator 8 (such as a filter or centrifuge, or the like). The liquid effluent from separator 8 is withdrawn and kept in hold tank 10 before being sent to the solvent recovery system (not shown). The wet cake of precipitated polyphenylene ether solids produced by separator 8 is washed with the non-solvent by conventional processes and transferred to a drier (not shown) and then is packaged, formulated, molded, or otherwise handled in conventional ways.

A solution of poly(2,6-dimethyl-1,4-phenylene)ether, 8.81 wt.%, in toluene, is pumped continuously into contact with a nonsolvent comprising methanol, 79 wt.% and water 9.7 wt.%, also including toluene, 11.3 wt.%. The weight ratio of water to methanol is 1:8.15. The volume ration of polyphenylene ether solution to non-solvent is 1.45:1. This mixture of toluene, methanol and water is capable of separating into two liquid phases, one of which consists largely of methanol and water, with only a small amount of toluene. The other, heavier phase, consists largely of toluene and polyphenylene ether and only a small amount of water and methanol.

The polymer solution is dispersed in this mixture by agitation and forms spherical droplets from which the polymer precipitates in the form of little spheres.

The product is recovered by filtration and, after drying, is subjected to sieve analysis and bulk density determination. The results are set out in Table 1:

Table 1

| Sieve | 20 | 30 | 50 | 100 | 200 | Fines |
|---|---|---|---|---|---|---|
| Weight % retained | 1.4 | 7.3 | 78.7 | 10.8 | 1.8 | 0.6 |

Sieve Analysis, U.S. Standard Sieve

Bulk density is 0.34 grams/cc.

This spherical material of very narrow particle size distribution and high bulk density is very superior to conventional polyphenylene ether in free-flowing characteristics, ease of blending, feeding to compounding extruders and producing molded articles of high surface appearance and excellent elongation.

COMPARATIVE EXAMPLE 1A

A solution of poly(2,6-dimethyl-1,4-phenylene)ether, 9.2 wt. %, in toluene, is pumped continuously into contact with a nonsolvent comprising methanol, 85.70 wt.%, and water 7.40 wt.%, also including toluene, 6.9 wt.%. The weight ration of water to methanol is 1:11.6. The volume ratio of polyphenylene ether solution to non-solvent is 1.45:1. This mixture of toluene, methanol and water is not capable of separating into two liquid phases.

The polymer precipitates from the homogeneous single-phase mixture in the form of an undefined powdery shape.

The product is recovered by filtration and after drying, is subjected to sieve analysis and bulk density determination. The results are set out in Table 2:

Table 2

| Sieve Analysis, U.S. Standard Sieve | | | | | | |
|---|---|---|---|---|---|---|
| Sieve | 20 | 30 | 50 | 100 | 200 | Fines |
| Weight % retained | 1.3 | 6.0 | 54.6 | 26.9 | 8.5 | 2.3 |
| Bulk density is 0.193 g./cc. | | | | | | |

As can be seen by comparison of the data in Tables 1 and 2, the particle size distribution of the product of Example 1 is very narrow and the bulk density is higher than that of Comparative Example 1A.

Example 1 illustrates a continuous precipitation from a two-phase system. The results obtained in Example 1 are believed to be due to the formation of a water shell, surrounding the droplets of dispersed polymer solution, from which the polymer is precipitated if the methanol concentration in the solvent droplet reaches a concentration of about 20 to 30%.

The compositions of the key solutions are analyzed and plotted as data points in FIG. 1.

With respect to Example 1, data point A represents the composition of non-solvent without added water and data point A' represents the composition of the non-solvent after adding water. Data point B represents the composition of the mixture of solvent and non-solvent after precipitation is complete. With respect to Comparative Example 1A, data point A corresponds to the composition of the non-solvent and data point B corresponds to the composition of the mixture of solvent and non-solvent after precipitation. It is seen that the composition of the mixture of Example 1 is below the binodal curve representing the boundary of the two-phase region, whereas the Comparatuve Example 1A is outside of the two-phase region.

The preferred composition of the mixture of non-solvent and solvent after precipitation is complete will be those shown by the shaded area of FIG. 1.

Obviously, other modifications and variations of the present invention are possible in light of the above teachings.

For example, instead of poly(2,6-dimethyl-1,4-phenylene)ether, there may be substituted: poly(2,6-diethyl-1,4-phenylene)ether; poly(2-methyl-6-ethyl-1,4-phenylene)ether; poly(2-methyl-6-propyl,-1,4-phenylene)ether; poly(2,6-diphenyl-1,4-phenylene)ether, and the like.

Instead of toluene, there may be substituted, benzene, o-xylene, m-xylene, p-xylene or mixtures of any of the foregoing.

Instead of methanol, there may be substituted ethanol, isopropanol, acetone or methyl ethyl ketone.

It is to be understood that changes may be made in the particular embodiments of the invention described which are within the full scope of the invention as defined by the appended claims.

I claim:

1. In a process for receiving a polyphenylene ether from a solution thereof in an aromatic solvent by mixing said solution with a non-solvent for said polyphenylene ether in an amount sufficient to cause separation of the polyphenylene ether therefrom, the improvement which comprises using as said non-solvent a medium selected from the group consisting of (i) water and a (lower) alkyl alcohol, (ii) water and a (lower) alkyl ketone, and (iii) water and a mixture of a (lower) alkyl alcohol and a (lower) alkyl ketone which is also capable of forming a two-phase system with the aromatic solvent and an aromatic solvent selected from the group consisting of benzene, toluene, the xylenes, ethyltoluene, chlorobenzene, dichlorobenzene, nitrobenzene and bromobenzene.

2. A process as defined in claim 1 wherein said solvent is an aromatic solvent and said non-solvent comprises a (lower)alkyl alcohol and water or a (lower)alkyl ketone and water, said water being present in an amount sufficient to cause said mixture of non-solvent and solvent to separate into two immiscible mixtures.

3. A process as defined in claim 2 wherein said aromatic solvent is benzene, toluene or xylene.

4. A process as defined in claim 2 wherein said (lower)alkyl alcohol is methanol, ethanol or isopropanol and said (lower)alkyl ketone is acetone.

5. A process as defined in claim 3 wherein said organic solvent is toluene and said non-solvent comprises from about 80 to about 95% by weight of methanol and from about 5 to about 20% by weight of water.

6. A process as defined in claim 3 wherein said non-solvent comprises methanol and water in a weight ratio of from 1:5 to 1:20 of water to methanol.

7. A process as defined in claim 6 wherein said aromatic solvent is toluene.

8. A process as defined in claim 1 wherein said polyphenylene ether is of the formula:

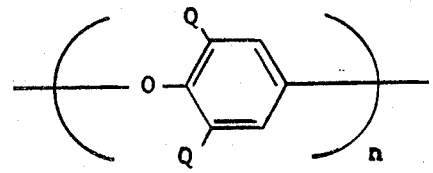

wherein the ether oxygen atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atoms and the phenyl nucleus, hydrocarbonoxy radicals and halohydrocarbonoxy radicals having at least two carbon atoms between the halogen atom and the phenyl nucleus.

9. A process as defined in claim 8 wherein each Q is an alkyl group having from 1 to 6 carbon atoms.

10. A process as defined in claim 9 wherein each Q is a methyl group.

11. In a process for recovering a polyphenylene ether from a solution thereof in an aromatic solvent by mixing said solution with a non-solvent for said polyphenylene ether in an amount sufficient to cause the separation of the polyphenylene ether therefrom, the improvement which comprises using a said aromatic solvent benzene, toluene or xylene and as said non-solvent a mixture of a (lower)alkyl alcohol and water or a (lower)alkyl ketone and water, said mixture being capable of forming a twophase system with the aromatic solvent.

12. A process as defined in claim 11 wherein a first phase consists substantially of said (lower)alkyl alcohol or said (lower)alkyl ketone and water with a relatively small amount of said aromatic solvent, and a second phase consists substantially of said aromatic solvent and said polyphenylene ether, and includes only a small amount of water and a relatively small amount of said (lower)alkyl alcohol or said (lower)alkyl ketone.

13. A process as defined in claim 11 wherein said aromatic solvent is toluene and said (lower)alkyl alcohol is methanol.

14. A process as defined in claim 12 wherein said aromatic solvent is toluene and said (lower)alkyl alcohol is methanol.

15. A process as defined in claim 11 wherein said polyphenylene ether is of the formula:

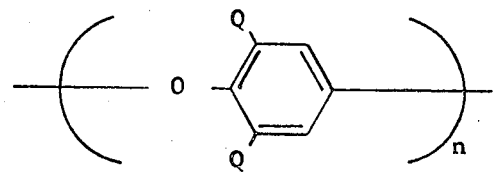

wherein the ether oxygen atom of one unit is connected to the benzene nucleus of the next adjoining unit, $n$ is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus.

16. A process as defined in claim 15 wherein each Q is an alkyl group having from 1 to 6 carbon atoms.

17. A process as defined in claim 16 wherein said Q is a methyl group.

18. A process as defined in claim 11 wherein said non-solvent comprises from about 80 to about 95% by weight of methanol and from about 5 to about 20% by weight of water.

19. A process as defined in claim 11 wherein said non-solvent comprises methanol and water in a weight ratio of from 1:5 to 1:20 of water to methanol.

20. A process as defined in claim 19 wherein said aromatic solvent is toluene.

* * * * *

UNITED STATES PATENT AND TRADEMARK OFFICE
CERTIFICATE OF CORRECTION

PATENT NO. : 3,923,738
DATED : December 2, 1975
INVENTOR(S) : Bernardus J. Van Sorge It is certified that error appears in the above-identified patent and that said Letters Patent are hereby corrected as shown below:

In Col. 6, line 1, delete "receiving" and insert in place thereof -- recovering --; line 53, delete "atoms" and insert in place thereof -- atom --; line 66, delete "a" and insert in place thereof -- as --.

In Col. 7, line 2, after "two" and before "phase", insert a hyphen (-).

In Col. 8, line 14, delete "said" and insert in place thereof -- each --.

Signed and Sealed this

Seventh Day of September 1976

[SEAL]

Attest:

RUTH C. MASON
*Attesting Officer*

C. MARSHALL DANN
*Commissioner of Patents and Trademarks*